July 23, 1963  L. J. RAVER  3,098,966
PROTECTIVE CIRCUIT FOR TRANSISTOR REGULATORS
Filed Aug. 26, 1960  2 Sheets-Sheet 1

INVENTOR.
LOUIS J. RAVER
BY C. R. Meland
HIS ATTORNEY

INVENTOR.
LOUIS J. RAVER
BY C.R. Meland
HIS ATTORNEY

United States Patent Office 3,098,966
Patented July 23, 1963

3,098,966
PROTECTIVE CIRCUIT FOR TRANSISTOR REGULATORS
Louis J. Raver, Anderson, Ind., assignor to General Motors Corporation, Detroit, Mich., a corporation of Delaware
Filed Aug. 26, 1960, Ser. No. 52,237
8 Claims. (Cl. 322—73)

This invention relates to electrical systems for motor vehicles and more particularly to a system wherein a semiconductor such as a transistor controls field current of the generator of the electrical system and wherein means are provided for preventing destruction of the semiconductor by transient voltage surges.

It has been found that when a voltage regulator of the transistor type is used on a motor vehicle electrical system wherein the generator of the system is driven by a diesel engine the transistor that controls the field current of the generator has often failed. The failure of the transistor has been due to voltage transients in the system which are set up when the solenoid coil winding that controls the diesel engine fuel rack is disconnected from the electrical system.

It accordingly is an object of this invention to provide a means for protecting the transistor of a transistor regulator from destruction by transient voltage surges that are set up in a motor vehicle electrical system by the disconnecting of inductive loads from the system.

Another object of this invention is to provide a motor vehicle electrical system wherein a transistor controls the field current of the generator of the system and wherein a condenser is connected to the system between the transistor and an inductive load so as to prevent damage to the transistor by transient voltages originated in the inductive load.

A further object of this invention is to provide a motor vehicle electrical system that includes an A.C. generator that is connected with rectifiers, a transistor regulator and a load including a storage battery that is supplied with charging current by the generator-rectifier combination, the system including means for preventing transient voltage surges from damaging the transistor of the regulator.

Figure 1:
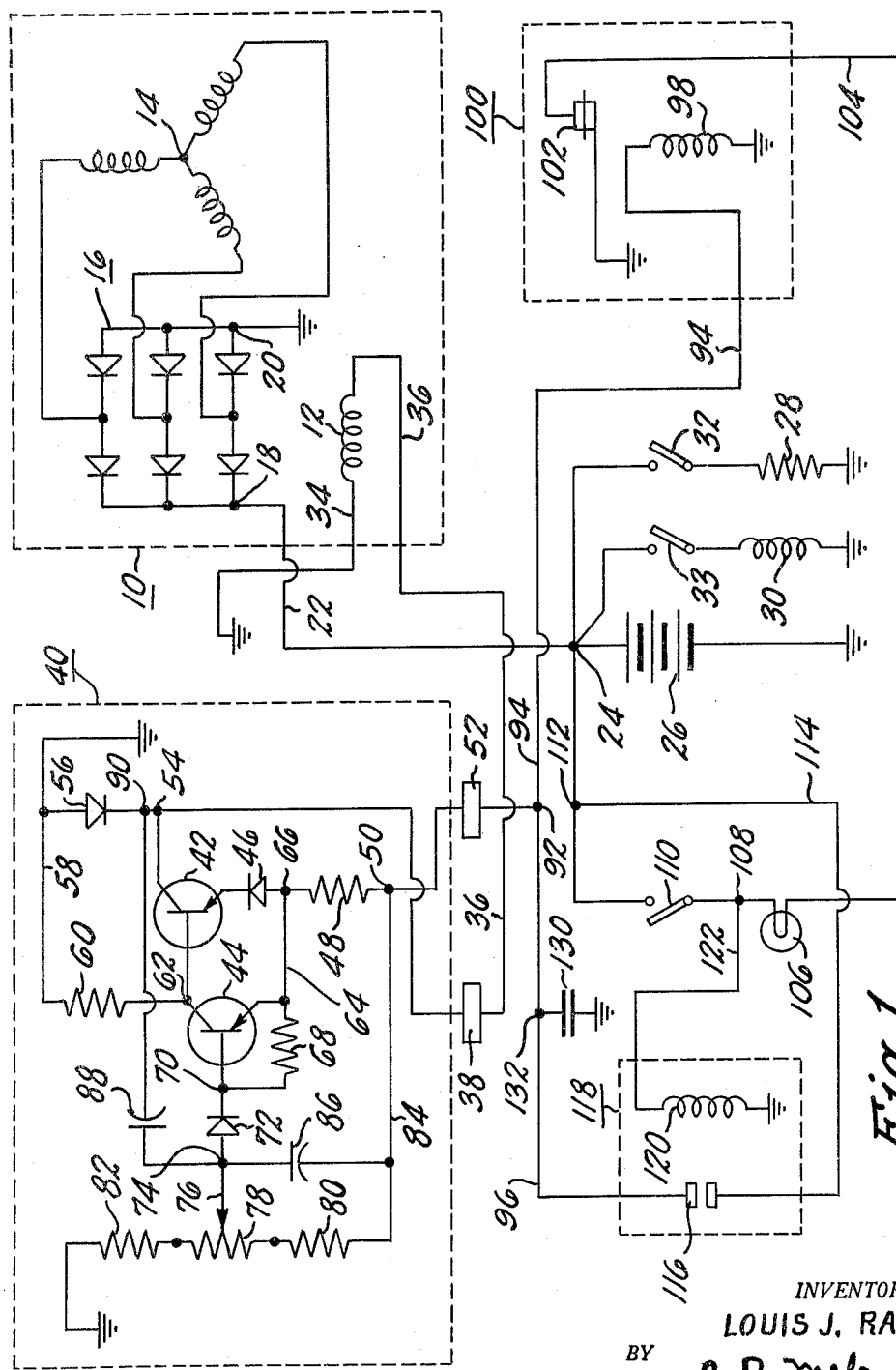
Figure 2:
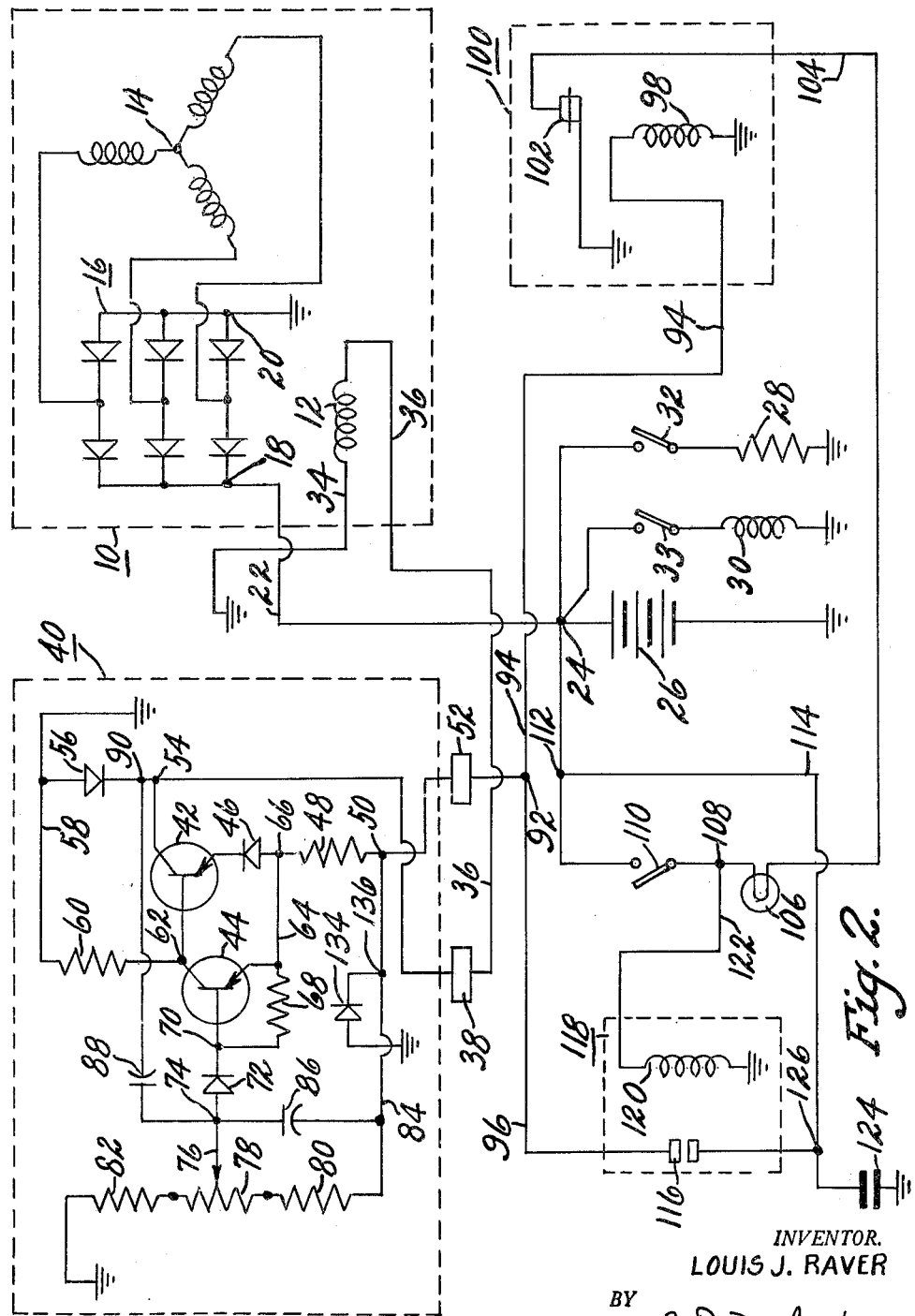

Further objects and advantages of the present invention will be apparent from the following description, reference being had to the accompanying drawings, wherein a preferred embodiment of the present invention is clearly shown In the drawings:
FIGURE 1 is a schematic illustration of a motor vehicle electrical system made in accordance with this invention.
FIGURE 2 is a schematic illustration of a modified motor vehicle electrical system made in accordance with this invention.

Referring now to FIGURE 1, the reference numeral 10 generally designates an A.C. generator-rectifier combination which is used to supply charging current to a storage battery and other loads of a motor vehicle electrical system. The A.C. generator has a field winding 12 and a three phase stator winding 14. It can be seen that the stator winding 14 is connected with a three phase full wave bridge rectifier network generally designated by reference numeral 16. The rectifier network 16 has direct current output terminals 18 and 20, the terminal 20 being connected directly to ground as shown.

The terminal 18 of the bridge rectifier network 16 is connected with a lead wire 22 and it is seen that this lead wire is connected with a junction 24. A storage battery 26 is connected between the junction 24 and ground and, therefore, receives charging current from the lead 22. The junction 24 is connected with the electrical loads of the motor vehicle which have been designated by reference numerals 28 and 30. The load 28 is a resistive load whereas the load 30 is an inductive load, and where the generator is driven by a diesel engine, the load 30 may be for example the solenoid coil that operates the fuel rack for the diesel engine. The loads 28 and 30 are connected to the junction 24 through the manually operable switches 32 and 33.

The field winding 12 of the generator 10 has one side thereof connected directly to ground via the lead wire 34 and has an opposite side connected with the lead wire 36. The field winding 12 is preferably driven by the engine of the motor vehicle and when so driven causes an A.C. voltage to be induced in the stator winding 14. It is apparent, however, that the electrical system of this invention could be used with any type of A.C. generator and could be used with brushless types wherein the field winding is fixed.

The lead wire 36 is connected with the field terminal 38 of a transistor voltage regulator which is generally designated by reference numeral 40. The regulator 40 includes the transistors 42 and 44, each having emitter, base and collector electrodes. The emitter electrode of transistor 42 is connected with a PN junction semiconductor diode 46 and it is seen that this diode is connected in series with the resistor 48. The resistor 48 is connected with a junction 50 and it is seen that this junction is connected with the positive terminal 52 of the regulator 40. The collector electrode of transistor 42 is connected with junction 54 and it is seen that this junction is connected to one side of a rectifier 56. The opposite side of rectifier 56 is connected with lead wire 58 which is connected directly to ground, as shown, and which is also connected with a resistor 60.

The resistor 60 is connected with junction 62 and it is seen that this junction is connected with the base electrode of transistor 42 and with the collector electrode of transistor 44. The emitter electrode of transistor 44 is connected with lead wire 64 and this lead wire is connected to the junction point 66. The lead wire 64 is connected with resistor 68, the opposite side of which is connected with the junction 70.

The Zener diode 72 is connected between the junction 70 and the junction 74. The junction 74 is connected with a shiftable tap 76 that cooperates with the resistor 78 to adjust the operating point of the regulator 40. It is seen that the resistor 78 is part of a voltage dividing network that includes this resistor, the resistor 80 and the resistor 82. One side of the resistor 82 is connected directly to ground and it is seen that one side of resistor 80 is connected with lead wire 84 which, in turn, is connected with junction 50. A condenser 86 is connected between the junction 74 and the lead wire 84. A second condenser 88 is connected between junction 74 and the junction 90.

The positive terminal 52 of regulator 40 is connected with a junction 92 and it is seen that this junction is connected with lead wires 94 and 96. The lead wire 94 is connected to a coil winding 98 of an indicator light relay which is generally designated by reference numeral 100. The relay 100 includes the contacts 102 which are held normally closed as by a spring and which open whenever the coil winding 98 is energized sufficiently. It can be seen that one of the contacts 102 is connected directly to ground whereas the other contact is connected with the lead wire 104. The lead wire 104 is connected to one side of an indicator lamp 106, the opposite side of this indicator lamp being connected with the junction 108. The junction 108 is connected to one side of an electric switch 110, which could be a manually operated ignition switch, a manually operated run switch for a diesel engine, or could be a switch that is controlled by engine oil pressure. The opposite side of switch 110 is connected with the junctions 112 and 24.

The junction 112 is connected with a lead wire 114 and it is seen that this lead wire is connected to one side of a pair of relay contacts 116. The relay contacts 116 are a part of a field relay which is generally designated by reference numeral 118 and which includes the coil winding 120. The relay contacts 116 are normally open, but are closed whenever the relay coil winding 120 is energized sufficiently. It can be seen that one side of the relay coil winding 120 is connected directly to ground, whereas the opposite side of this coil winding is connected with junction 108 via the lead wire 122. A condenser 130 is connected between the junction 132 and ground and serves to absorb transient voltage surges in the electrical system and thus prevent them from destroying the transistor 42.

In the operation of this system, when the switch 110 is closed, it is apparent that the coil winding 120 of relay 118 will be energized to close the relay switch contacts 116. The closing of switch 110 will also energize the indicator lamp 106 through the closed contacts 102. As the engine of the motor vehicle is now started and is running, the generator will develop an output voltage and charging current will therefore be supplied to the battery 26 and to the electrical loads 28 and 30 via the lead wire 22. When lead wire 22 is carrying charging current it will energize the coil winding 98 sufficiently to cause an opening of contacts 102 and therefore break the circuit to the indicator light 106 which will indicate that the generator-rectifier 10 is developing a greater voltage than the terminal voltage of the battery 26.

The output voltage of the generator-rectifier combination 10 is maintained at a substantially constant level by the transistor voltage regulator 40. It can be seen that the field winding 12 of the generator will be energized via a circuit that includes lead wire 22, junction 24, junction 112, lead wire 114, relay contacts 116, lead wire 96, junction 92, terminal 52, resistor 48 and diode 46, through the emitter to collector circuit of transistor 42, through junction 54, through terminal 38, through lead wire 36, through the field winding 12 and thence through the lead wire 34 to ground. It is seen that the energization path for the field winding 12 is therefore through the emitter to collector circuit of transistor 42 and it is therefore obvious that the field current will be varied in accordance with the conduction of the transistor 42.

The transistor 42 is so interconnected with the transistor 44 that when the transistor 44 is substantially fully conducting, the transistor 42 is substantially fully nonconducting and vice versa. The conduction of transistor 42 is controlled by the voltage reference Zener diode 72 and the voltage applied to this diode is a function of the voltage developed across the voltage dividing network consisting of resistors 80, 78, and 82. When the voltage between lead wire 22 and ground is above the desired regulated value, the transistor 42 is switched off to reduce field current and when the voltage is low, the transistor 42 is switched on to increase field current. This switching occurs very rapidly and when voltage regulation is required, the transistor 42 is turned on and off at a rapid rate to maintain the output voltage of the generator-rectifier combination 10 substantially constant.

The electrical system of this invention has been effective to provide very accurate control of field current for the generator and in general, has been rugged in operation. It has been found, however, that when an inductive load 30 is supplied from the junction 24 a transient voltage is introduced into the electrical system when the switch 33 is opened. It has further been found that this transient voltage at times will completely destroy the transistor 42 so that voltage regulation is no longer available for the system. To remedy this situation, a condenser 130 is connected between junction 132 and ground and this condenser will absorb the voltage transient to prevent it from destroying the transistor 42.

It is pointed out that when the contacts 116 open to deenergize the coil 98, the induced voltage of the coil 98 is sufficient at times to destroy the transistor 42. This destruction of the transistor is prevented, however, by the condenser 130 which will absorb this voltage as well as the voltage of coil 30.

Another circuit for preventing destruction of the transistor 42 by voltage transients is illustrated in FIGURE 2. This circuit is identical with the circuit of FIGURE 1 with the exception that the voltage absorbing condenser, designated by reference numeral 124 in FIGURE 2, is connected between junction 126 and ground. The other difference is that a diode 134 is connected between junction 136 and ground. The condenser 124 serves to absorb the induced voltage of coil 30 but will not absorb the induced voltage of coil 98. The circuit including the diode 134 will dissipate the energy developed by the coil 98 when the diode is connected in the direction shown in FIGURE 2. The FIGURE 1 embodiment is preferred since in that embodiment, no extra diode is required.

It is to be pointed out that the regulator 40 could be a voltage regulator or could be a combined voltage and current regulator. It is also apparent that other devices than a second transistor could be used for controlling the conduction of transistor 42. Thus, a voltage or current sensitive device such as a relay could be used for controlling the conduction of transistor 42 and this invention is useful with any system wherein a transistor is used to control the field current of a generator without regard to what type of apparatus controls the conduction of the transistor.

While the embodiments of the invention as herein disclosed constitute a preferred form, it is to be understood that other forms might be adopted.

What is claimed is as follows:

1. In combination, an alternating current generator having a three phase output winding and a field winding, a three phase full wave bridge rectifier network having a pair of D.C. output terminals and a plurality of A.C. input terminals connected with said output winding, a transistor voltage regulating means comprising first and second transistors each having emitter, collector and base electrodes, said transistor voltage regulating means having a positive terminal, a field terminal and a negative terminal, conductor means connecting one side of said field winding with the field terminal of said transistor voltage regulating means, conductor means connecting said field terminal with the collector electrode of said first transistor, a circuit connecting said positive terminal and the emitter electrode of said first transistor including a first diode poled to conduct current towards said emitter of said first transistor, means connecting the collector electrode of said second transistor with the base electrode of said first transistor, means connecting the emitter electrode of said second transistor to a side of said first diode opposite from its connection with the emitter electrode of said first transistor, a voltage dividing network connected across the positive and negative terminals of said transistor voltage regulator, a Zener diode connected between the base electrode of said second transistor and said voltage divider network, a second diode connected in parallel with said field winding, and a third diode connected between said positive and negative terminals of said transistor voltage regulator.

2. A transistor voltage regulator for regulating the field current of a generator comprising, a positive terminal, a negative terminal and a field terminal, first and second transistors each having emitter, collector and base electrodes, means connecting the collector electrode of said first transistor with said field terminal of said voltage regulator, a circuit connecting said positive terminal with the emitter electrode of said first transistor including a resistor and a first diode having a common junction, means connecting the base electrode of said first transistor with the collector electrode of said second transistor, means connecting the emitter electrode of said second transistor with said common junction of said resistor and said first diode, a voltage dividing network connected across said positive and negative terminals, a Zener diode connecting the base electrode of said second transistor and said voltage divider network, a second diode connected between the collector electrode of said first transistor and said negative terminal, and a third diode connecting said positive and negative terminals.

3. A transistor voltage regulator for use in regulating the field current of a generator comprising, a positive terminal, a negative terminal and a field terminal, first and second transistors each having emitter, collector and base electrodes, means connecting the collector electrode of said first transistor with said field terminal, a circuit connecting said positive terminal with the emitter electrode of said first transistor including a first diode poled to conduct current in a direction toward said emitter electrode, means connecting the base electrode of said first transistor with the collector electrode of said second transistor, means connecting the emitter electrode of said second transistor with said positive terminal, a voltage divider network connected across said positive and negative terminals, a Zener diode connected between the base electrode of said second transistor and said voltage dividing network, and a second diode connected between said positive and negative terminals having its cathode connected with said positive terminal.

4. A transistor voltage regulator comprising, a field terminal, a positive terminal and a negative terminal, first and second transistors each having emitter, collector and base electrodes, means connecting the field terminal of said voltage regulator with the collector electrode of said first transistor, means connecting the base electrode of said first transistor with the collector electrode of said second transistor, a resistor, means connecting one side of said resistor with said positive terminal, means connecting an opposite side of said resistor with the emitter electrodes of both of said transistors, a voltage dividing network connected across said positive and negative terminals, a Zener diode connecting the base electrode of said second transistor with said voltage dividing network, and a diode connecting said positive and negative terminals.

5. A transistor voltage regulator for controlling the field current of a generator comprising, a positive terminal, a field terminal and a negative terminal, first and second transistors each having emitter, collector and base electrodes, means connecting the collector electrode of said first transistor with said field terminal, a first diode, means connecting said first diode between said positive terminal and the emitter electrode of said first transistor, said first diode being poled to conduct current toward said emitter electrode, means connecting the emitter electrode of said second transistor between the anode of said first diode and said positive terminal, means connecting the base electrode of said first transistor with the collector electrode of said second transistor, a voltage developing sensing circuit connected across said positive and negative terminals, a Zener diode connected between said sensing circuit and the base electrode of said second transistor, a second diode connected between the collector electrode of said first transistor and said negative terminal and a transient voltage protective circuit element connected between said positive terminal and said negative terminal.

6. The transistor voltage regulator according to claim 5 wherein the transient voltage protective circuit element is a capacitor.

7. The transistor voltage regulator according to claim 5 wherein the transistor protective circuit element is a diode having its cathode connected with the positive terminal of the regulator and its anode connected with the negative terminal of the regulator.

8. A transistor voltage regulator for regulating the field current of a generator comprising, a positive terminal, a negative terminal and a field terminal, first and second transistors each having emitter, collector and base electrodes, means connecting said field terminal with the collector electrode of said first transistor, means connecting the emitter electrodes of said first and second transistors with said positive terminal, a circuit connecting the base electrode of said first transistor and the collector electrode of said second transistor, said circuit being connected with said negative terminal of said transistor voltage regulator, a voltage developing sensing circuit connected across said positive and negative terminals, a Zener diode connected between said voltage developing sensing circuit and the base electrode of said second transistor, and a diode having its cathode connected with said positive terminal and its anode connected with said negative terminal.

References Cited in the file of this patent

UNITED STATES PATENTS

| | | |
|---|---|---|
| 2,776,382 | Jensen | Jan. 1, 1957 |
| 2,809,301 | Short | Oct. 8, 1957 |
| 2,922,945 | Norris et al. | Jan. 26, 1960 |
| 2,958,033 | Mittag et al. | Oct. 25, 1960 |
| 2,967,251 | Dodge | Jan. 3, 1961 |
| 2,967,990 | Rady et al. | Jan. 10, 1961 |